United States Patent
Hagio et al.

(10) Patent No.: US 9,901,882 B2
(45) Date of Patent: Feb. 27, 2018

(54) DDR ZEOLITE SEED CRYSTAL, METHOD FOR PRODUCING SAME, AND METHOD FOR PRODUCING DDR ZEOLITE MEMBRANE

(71) Applicant: NGK Insulators, Ltd., Nagoya (JP)

(72) Inventors: Takeshi Hagio, Nagoya (JP); Makiko Ichikawa, Nagoya (JP); Kenji Yajima, Nagoya (JP); Makoto Miyahara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/248,074

(22) Filed: Aug. 26, 2016

(65) Prior Publication Data

US 2016/0361691 A1    Dec. 15, 2016

Related U.S. Application Data

(60) Division of application No. 14/496,436, filed on Sep. 25, 2014, now abandoned, which is a continuation of application No. PCT/JP2013/060415, filed on Mar. 29, 2013.

(30) Foreign Application Priority Data

Mar. 30, 2012    (JP) ................. 2012-080496

(51) Int. Cl.

| | |
|---|---|
| *C01B 39/48* | (2006.01) |
| *B01J 29/70* | (2006.01) |
| *B01D 71/02* | (2006.01) |
| *B01D 69/10* | (2006.01) |
| *B01D 53/22* | (2006.01) |
| *B01D 67/00* | (2006.01) |
| *C01B 37/02* | (2006.01) |

(52) U.S. Cl.

CPC ......... *B01D 71/028* (2013.01); *B01D 53/228* (2013.01); *B01D 67/0046* (2013.01); *B01D 67/0051* (2013.01); *B01D 69/10* (2013.01); *B01J 29/70* (2013.01); *C01B 37/02* (2013.01); *C01B 39/48* (2013.01); *B01D 2253/108* (2013.01); *B01D 2255/50* (2013.01); *Y10T 428/2982* (2015.01)

(58) Field of Classification Search

CPC .......... C01B 37/02; C01B 39/48; B01J 29/70; B01D 53/228; B01D 67/0046; B01D 67/0051; B01D 69/10; B01D 71/028; B01D 2253/108; B01D 2255/50

See application file for complete search history.

(56) References Cited

U.S. PATENT DOCUMENTS

| | | |
|---|---|---|
| 2005/0139066 A1 | 6/2005 | Miller et al. |
| 2008/0047432 A1 | 2/2008 | Nonaka et al. |
| 2010/0144512 A1 | 6/2010 | Uchikawa et al. |
| 2010/0298115 A1 | 11/2010 | Yajima et al. |
| 2011/0160039 A1 | 6/2011 | Himeno et al. |
| 2011/0287261 A1 | 11/2011 | Yajima et al. |
| 2012/0000358 A1 | 1/2012 | Kawai et al. |

FOREIGN PATENT DOCUMENTS

| | | | |
|---|---|---|---|
| EP | 2 409 758 A1 | | 1/2012 |
| JP | 2004-082008 A1 | | 3/2004 |
| JP | 2005053747 A | * | 5/2005 |
| JP | 3757115 B2 | | 3/2006 |
| JP | 2008-074695 A1 | | 4/2008 |
| JP | 2010-158665 A1 | | 7/2010 |
| JP | 2011-131174 A1 | | 7/2011 |
| WO | 2009/113715 A1 | | 9/2009 |
| WO | 2010/090049 A1 | | 8/2010 |

OTHER PUBLICATIONS

Exter et al, "Separation of permanent gases on the all-silica 8-ring clathrasil DD3R", Zeolites and Related Microporous Materials: State of the Art 1994, (1194) pp. 1159-1166.*
H. Gies, "Studies on Clathrasils: VII. A New Clathrate Compound of Silica: Synthesis, Crystallographic, and Thermal Properties," Journal of Inclusion Phenomena, 2 (1984), pp. 275-278.
Jorge Gascon, et al., "Accelerated Synthesis of All-Silica DD3R and its Performance in the Separation of Propylene/Propane Mixtures," Microporous and Mesoporous Materials, vol. 115 (2008), pp. 585-593.
A. Stewart, et al., "Synthesis and Characterisation of Crystalline Aluminosilicate Sigma-1," Studies in Surface Science and Catalysis, vol. 37 (1988), pp. 57-64.
International Search Report and Written Opinion (Application No. PCT/JP2013/060415) dated Jul. 9, 2013.
Partial European Search Report (Applcation No. 13768035.1) dated Nov. 9, 2015.
Extended European Search Report (Application No. 13768035.1) dated Mar. 7, 2016.
Database of Zeolite Structures, IZA-SC, Framework Type DDR, 6 pages (2007).

* cited by examiner

*Primary Examiner* — David M Brunsman
(74) *Attorney, Agent, or Firm* — Burr & Brown, PLLC

(57) ABSTRACT

There are provided DDR type zeolite seed crystals capable of inhibiting generation of surplus DDR type zeolite crystals in the case of using the DDR type zeolite seed crystals as seed crystals upon forming a DDR type zeolite membrane on the surface of a porous support. The DDR type zeolite seed crystals have an average particle size of 0.05 to 1.5 μm; contain 90% or more of particles having an aspect ratio, which is obtained by dividing the maximum Feret's diameter by the minimum Feret's diameter, of 1 to 3; and have not more than 0.3 of a coefficient of variation of the square of the aspect ratio.

10 Claims, 1 Drawing Sheet

200nm

200nm

DDR ZEOLITE SEED CRYSTAL, METHOD FOR PRODUCING SAME, AND METHOD FOR PRODUCING DDR ZEOLITE MEMBRANE

CROSS-REFERENCE TO RELATED APPLICATIONS

This application is a Divisional of U.S. application Ser. No. 14/496,436, filed Sep. 25, 2014, the entirety of which is incorporated herein by reference, now abandoned, which is a Continuation of PCT/JP2013/060415, filed Mar. 29, 2013, and claims the benefit under 35 USC § 119(a)-(d) of Japanese Patent Application No. 2012-080496 filed on Mar. 30, 2012.

BACKGROUND OF THE INVENTION

1. Field of the Invention

The present invention relates to a DDR type zeolite seed crystal, a production method thereof, and a production method of a DDR type zeolite membrane. More specifically, the present invention relates to a DDR type zeolite seed crystal capable of inhibiting generation of surplus DDR type zeolite crystals when the DDR type zeolite seed crystal is used as a seed crystal upon forming a DDR type zeolite membrane on the surface of the porous support, and to a method for manufacturing the DDR type zeolite seed crystal. In addition, the present invention relates to a method for manufacturing a DDR type zeolite membrane capable of inhibiting generation of surplus DDR type zeolite crystals.

2. Description of Related Art

Zeolite is used as a catalyst, a catalyst carrier, an adsorbent, and the like. In addition, a zeolite membrane formed on the surface of the porous support made of metal or ceramic utilizes a molecular sieve function of zeolite, and is becoming popular as a gas separation membrane or a pervaporation membrane.

As zeolite, there are many kinds such as LTA, MFI, MOR, AFI, FER, FAU, and DDR depending on their crystal structures. Of these, a DDR (Deca-Dodecasil 3R) type zeolite is a crystal having silica as the main component. Its pores are formed by a polyhedron including an oxygen eight-membered ring. Furthermore, it is known that the pore size of the oxygen eight-membered ring is 4.4×3.6 angstrom. These are described in "W. M. Meier, D. H. Olson, Ch. Baerlocher, Atlas of zeolite structure types, Elsevier (1996)".

A DDR type zeolite has relatively small pore sizes among zeolites and may be usable suitably as a molecular sieve membrane for low molecular gas such as carbon dioxide ($CO_2$), methane ($CH_4$), and ethane ($C_2H_6$).

As such a method for forming a DDR type zeolite membrane on the surface of a porous support, first, DDR type zeolite crystals functioning as seed crystals are prepared (see, e.g., non-patent documents 1 to 3 and patent documents 1 and 2). Then, there is a method wherein the DDR type zeolite seed crystals are applied on the surface of the porous support in advance, and then subjected to hydrothermal synthesis in a raw material solution, to grow to form a membrane (see, e.g., Patent Documents 3 and 4).

RELATED ART DOCUMENTS

Patent Documents

Patent Document 1: WO 2010/90049
Patent Document 2: JP Patent No. 3757115 bulletin
Patent Document 3: JP 2004-82008 A bulletin
Patent Document 4: JP 2008-74695 A bulletin Non-Patent Documents Non-patent document 1: H. Gies, Journal of Inclusion Phenomena 2, (1984) 275-278
Non-patent document 2: J. Gascon, W. Blom, A. van Miltenburg, A. Ferreira, R. Berger, F. Kapteijn, Microporous and Mesoporous Materials vol. 115, (2008) 585-593
Non-patent document 3: A. Stewart, D. W. Johnson and M. D. Shannon, Studies in Surface Science and Catalysis vol. 37, (1988) 57-64

SUMMARY OF THE INVENTION

Problem to be Solved by the Invention

In hydrothermal synthesis, there has conventionally been a problem of detachment of some of the DDR type zeolite seed crystals applied on the surface of the porous support in advance, in a raw material solution to grow also on a location other than the surface of the porous support. For example, when a membrane is formed on the surface of a porous support of a tube shape, a monolith shape, a honeycomb shape, or the like, and having through-holes functioning as fluid passages, there has been a problem of growth of the detached seed crystals in the open ends and the inside of the through-holes to cause clogging of through-holes. Such phenomenon of clogging of through-holes prominently appears particularly in the case of forming a membrane on the surface of a porous support having through-holes having a small diameter in a "cross section perpendicular to the fluid flow direction". By the aforementioned clogging of through-holes, there have been problems such as reduction in an effective membrane area and damaging of the membrane upon removing the clog, thereby deteriorating the membrane performance, and the like. In addition, when a membrane is formed on the surface of the aforementioned porous support having through-holes and the surface of a plane porous support having no through-hole, there have been problems such as causing permeation hindrance by increase of the membrane thickness and causing a crack in the membrane, due to adhesion of detached DDR type zeolite seed crystals to the membrane during growth (forming a membrane).

The present invention has been made in view of such problems of the related art. The present invention is a DDR type zeolite seed crystal capable of inhibiting generation of surplus DDR type zeolite crystals when the DDR type zeolite seed crystals are used as seed crystals upon forming a DDR type zeolite membrane on the surface of the porous support, and a method for manufacturing the DDR type zeolite seed crystal. In addition, the present invention is a method for manufacturing a DDR type zeolite membrane capable of inhibiting generation of surplus DDR type zeolite crystals.

Means to Solve the Problems

According to the present invention, there are provided the following DDR type zeolite seed crystals, a method for manufacturing the same, and a method for manufacturing a DDR type zeolite membrane.

[1] A DDR type zeolite seed crystal having an average particle size of 0.05 to 1.5 μm; containing 90% or more of particles having an aspect ratio, which is a value obtained by dividing the maximum Beret's diameter by the minimum Feret's diameter, of 1 to 3; and having not more than 0.3 of a coefficient of variation of the square of the aspect ratio.

[2] The DDR type zeolite seed crystal according to [1], wherein the average particle size is 0.05 to 1.0 μm.

[3] The DDR type zeolite seed crystal according to [1] or [2], wherein a Y value calculated from the following formula (1) is not less than 60, while defining a diffraction intensity of a diffraction peak caused by (024) plane of the DDR type zeolite crystal as A, a minimum value of a diffraction intensity between the peaks of the (024) plane and (116) plane, which is influenced by an amorphous substance content, as B, and a minimum value of a diffraction intensity between the peaks of the (024) plane and (202) plane as C, on the basis of the diffraction intensity obtained by X-ray diffraction analysis.

$$Y=(A-C)/(B-C) \quad (1)$$

[4] A method for manufacturing a DDR type zeolite seed crystal to obtain the DDR type zeolite seed crystal according to any one of [1] to [3], the method comprising a heating step of heating a raw material solution containing silica, and a nucleus containing a DDR type zeolite, at 130 to 180° C. for four hours or more to form the DDR type zeolite seed crystal.

[5] The method for manufacturing a DDR type zeolite seed crystal according to [4], wherein the nucleus is a DDR type zeolite crystal, or a mixture of a DDR type zeolite crystal and amorphous silica.

[6] The method for manufacturing a DDR type zeolite seed crystal according to [4] or [5], wherein the raw material solution further contains 1-adamantanamine as a structure-directing agent of DDR type zeolite, and the ratio of the molar number of the 1-adamantanamine to the molar number of the silica is 0.1 or less.

[7] The method for manufacturing a DDR type zeolite seed crystal according to [6], wherein the DDR type zeolite seed crystal contains the 1-adamantanamine, and the specific surface area of the DDR type zeolite seed crystal containing the 1-adamantanamine is smaller than the specific surface area obtained from a particle size distribution on the assumption that the DDR type zeolite seed crystal is sphere.

[8] The method for manufacturing a DDR type zeolite seed crystal according to any one of [4] to [7], further comprising a washing step of washing the formed DDR type zeolite crystal after the heating step.

[9] The method for manufacturing a DDR type zeolite seed crystal according to [8], wherein in the washing step, a DDR type zeolite crystal dispersion liquid is prepared by dispersing the washed DDR type zeolite crystal in a dispersion medium to obtain a DDR type zeolite crystal-dispersed liquid having a pH of 7.5 or more.

[10] The method for manufacturing a DDR type zeolite seed crystal according to any one of [4] to [9], wherein the DDR type zeolite seed crystal is manufactured without any mechanical treatment.

[11] A method for manufacturing a DDR type zeolite membrane, the method having an application step of applying slurry containing the DDR type zeolite seed crystal according to any one of [1] to [3] on a surface of a porous support to manufacture a seed crystal-adhered porous support.

[12] The method for manufacturing a DDR type zeolite membrane according to [11], wherein the average value of the opening size of pores opening on the surface of the portion of the porous support on which the seed crystal is to be applied, is not larger than the average particle size of the DDR type zeolite seed crystal.

[13] The method for manufacturing a DDR type zeolite membrane according to [11] or [12], comprising a DDR type zeolite membrane forming step of immersing the seed crystal-adhered porous support in a membrane-forming raw material solution containing 1-adamantanamin and silica, and heating to form a DDR type zeolite membrane, which is a DDR type zeolite membrane containing 1-adamantanamine, on the surface of the porous support.

[14] The method for manufacturing a DDR type zeolite membrane according to [13], wherein, in the DDR type zeolite membrane forming step, the ratio of precipitates other than the DDR type zeolite membrane to the membrane-forming raw material solution is 0.2% or less by mass.

Effect of the Invention

DDR type zeolite seed crystals of the present invention have an average particle size of 0.05 to 1.5 μm; contain 90% or more of particles having an aspect ratio, which is obtained by dividing the maximum Feret's diameter by the minimum Feret's diameter, of 1 to 3; and have not more than 0.3 of a coefficient of variation of the square of the aspect ratio. Therefore, the DDR type zeolite seed crystals of the present invention hardly fall off the surface of a porous support when they are used as seed crystals upon forming a DDR type zeolite membrane on the surface of the porous support. Therefore, formation of a DDR type zeolite membrane on the surface of a porous support using the DDR type zeolite seed crystals of the present invention enables to inhibit generation of surplus DDR type zeolite crystals. In addition, according to a method for manufacturing DDR type zeolite seed crystals of the present invention, such DDR type zeolite seed crystals of the present invention can be manufactured.

In addition, since a method for manufacturing a DDR type zeolite membrane of the present invention manufactures a DDR type zeolite membrane using DDR type zeolite seed crystals of the present invention, generation of surplus DDR type zeolite crystals can be inhibited.

MODE FOR CARRYING OUT THE INVENTION

Figure 1:
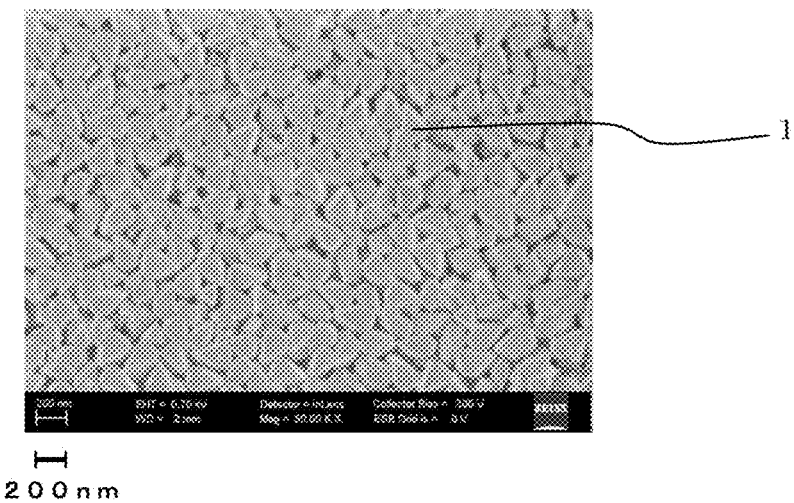
FIG. 1 is a micrograph of DDR type zeolite seed crystals of Example 1.

Hereinbelow, the present invention will specifically be described with referring to drawings regarding embodiments for carrying out the present invention. The present invention is not limited to the following embodiments, and it should be understood that changes, improvements, and the like may appropriately be made on the basis of knowledge of a person of ordinary skill in the art within the scope of not deviating from the gist of the present invention.

(1) DDR Type Zeolite Seed Crystal:

One embodiment of DDR type zeolite seed crystals of the present invention has an average particle size of 0.05 to 1.5 μm; contains 90% or more of "particles having 'an aspect ratio, which is obtained by dividing the maximum Feret's diameter by the minimum Feret's diameter' of 1 to 3"; and has not more than 0.3 of a coefficient of variation of the square of the aspect ratio.

Since the DDR type zeolite seed crystals of the present embodiment have such a configuration, when they are used as seed crystals upon forming a DDR type zeolite membrane on a surface of a porous support, they hardly fall off the surface of the porous support. Therefore, when a DDR type zeolite membrane is formed on the surface of the porous support by the use of the DDR type zeolite seed crystals of the present embodiment, generation of surplus DDR type zeolite crystals can be inhibited.

The DDR type zeolite seed crystals of the present embodiment have an average particle size of 0.05 to 1.5 μm, preferably 0.05 to 1.0 μm, more preferably 0.1 to 0.5 μm. When the average particle size is smaller than 0.05 μm, the usable (applicable) pore size of the porous support upon manufacturing a DDR type zeolite membrane becomes small, and the permeation amount in the resultant DDR type zeolite membrane is unfavorably reduced. When the average particle size is larger than 1.5 μm, the seed crystals in the "slurry containing seed crystals" precipitate in a short period of time, and it unfavorably becomes difficult to maintain dispersibility of the "slurry containing seed crystals" upon applying the seed crystals on the surface of the porous support. The average particle size is a value measured by a dynamic light-scattering method.

The DDR type zeolite seed crystals of the present embodiment contain 90% or more of particles having an "aspect ratio, which is obtained by dividing the maximum Feret's diameter by the minimum Feret's diameter" of 1 to 3. In addition, the DDR type zeolite seed crystals of the present embodiment contain preferably 95% or more, more preferably 98% or more, particularly preferably 100% or more of "particles having an aspect ratio of 1 to 3". When the content of the "particles having an aspect ratio of 1 to 3" is less than 90%, the DDR type zeolite seed crystals adhered to the surface of the porous support easily fall off the surface of the porous support unfavorably upon forming a DDR type zeolite membrane on the surface of the porous support.

In the DDR type zeolite seed crystal of the present embodiment, the aspect ratio is a "value obtained by dividing the maximum Feret's diameter by the minimum Feret's diameter". The maximum Feret's diameter is the distance between two parallel straight lines which sandwich a DDR type zeolite seed crystal so that the "distance between the two parallel straight lines becomes largest" on a FE-SEM image of DDR type zeolite seed crystals. In addition, the minimum Feret's diameter is the distance between two parallel straight lines which sandwich a DDR type zeolite seed crystal so that the "distance between the two parallel straight lines becomes smallest" on a FE-SEM image of DDR type zeolite seed crystals. The maximum Feret's diameter and the minimum Feret's diameter are measured by the use of FE-SEM (field emission scanning electron microscopy (in-lens)) as described above.

The content of the "particles having an aspect ratio of 1 to 3" is measured as follows. DDR type zeolite seed crystals are observed by the use of FE-SEM (field emission scanning electron microscopy (in-lens)). The DDR type zeolite seed crystals are observed within an area including at least 20 DDR type zeolite seed crystals and ranging "from (average particle size)$^2$×50 to (average particle size)$^2$×200". The "average particle size" means a median value (D50) of particle size based on volume of the DDR type zeolite seed crystals. Then, regarding 20 DDR type zeolite seed crystals, the maximum Feret's diameter and the minimum Feret's diameter are measured, and each aspect ratio is calculated. Then, the content of the "particles having an aspect ratio of 1 to 3" is calculated. The "average particle size" is a value measured by a dynamic light-scattering method.

The DDR type zeolite seed crystal of the present embodiment has not more than 0.3 of a coefficient of variation of the square of the aspect ratio, preferably not more than 0.25, more preferably 0 to 0.2, particularly preferably 0. When the coefficient of variation of the square of the aspect ratio is above 0.3, the DDR type zeolite seed crystals adhered to the surface of the porous support easily fall off the surface of the porous support unfavorably upon forming a DDR type zeolite membrane on the surface of the porous support.

The "coefficient of variation of the square of the aspect ratio" is a value obtained by dividing the standard deviation of the "square of the aspect ratio" by the average value of the "square of the aspect ratio". The "coefficient of variation of the square of the aspect ratio" is measured as follows. DDR type zeolite seed crystals are observed by the use of FE-SEM (field emission scanning electron microscopy (in-lens)). The DDR type zeolite seed crystals are observed within an area including at least 20 DDR type zeolite seed crystals and ranging "from (volume D50)$^2$×50 to (volume D50)$^2$×200". Then, regarding 20 DDR type zeolite seed crystals, the maximum Feret's diameter and the minimum Feret's diameter are measured, and each aspect ratio is calculated. Then, using the aspect ratio regarding the 20 DDR type zeolite seed crystals obtained, the "coefficient of variation of the square of the aspect ratio" is obtained.

In the diffraction intensity obtained by X-ray diffraction analysis of the DDR type zeolite seed crystals of the present embodiment, the diffraction intensity of the diffraction peak due to the (024) plane of the DDR type zeolite crystals is defined as A. Then, the minimum value of the diffraction intensity between the peaks of the (024) plane and the (116) plane, which is influenced by an amorphous substance content, is defined as B, and the minimum value of the diffraction intensity between the peaks of the (024) plane and the (202) plane is defined as C. In that case, in the DDR type zeolite seed crystals of the present embodiment, it is preferable that the value Y ((A−C)/(B−C)) obtained by dividing the subtraction of C from A by the subtraction of C from B is 60 or more. Then, the value Y is preferably 70 or more, more preferably 75 or more. When the value Y is smaller than 60, the crystallinity is low, and there are many amorphous substances. Therefore, it may be difficult to form the DDR type zeolite membrane in a good condition. In addition, the DDR type zeolite seed crystals are easily detached. The Y value, which shows the relation between the amount of the DDR type zeolite crystals and the amount of the amorphous substances, can be said to be a "crystallinity index" of the DDR type zeolite seed crystals.

(2) Method for Manufacturing a DDR Type Zeolite Seed Crystal:

One embodiment of a method for manufacturing DDR type zeolite seed crystals of the present invention has a heating step of heating a raw material solution containing silica, and nuclei containing DDR type zeolite, at 130 to 180° C. for four hours or more to form DDR type zeolite crystals. By the method for manufacturing DDR type zeolite seed crystals of the present embodiment, the aforementioned DDR type zeolite seed crystals of the present invention can be obtained.

Hereinbelow, the method for manufacturing a DDR type zeolite seed crystal of the present embodiment will be described for each step.

(2-1) Heating Step:

In one embodiment of the method for manufacturing DDR type zeolite seed crystals of the present embodiment, the heating step is a step where a raw material solution containing silica, and nuclei containing DDR type zeolite, is heated at 130 to 180° C. for four hours or more to form DDR type zeolite crystals.

The average particle size of the nuclei containing DDR type zeolite used for the heating step is preferably 10 to 300 nm. The nuclei containing DDR type zeolite are preferably DDR type zeolite crystals or a "mixture of DDR type zeolite crystals and amorphous silica". The average particle size of the nuclei containing DDR type zeolite is a value measured by a dynamic light-scattering method. There is no particular limitation on the method for manufacturing the nuclei containing DDR type zeolite. For example, the following method can be employed. A solution containing 1-adamantanamine, silica ($SiO_2$), and water is subjected to a heating treatment at a temperature of about 100 to 180° C. to produce nuclei in which a structure-directing agent (1-adamantanamine) is contained in DDR type zeolite. The "nuclei containing 'DDR type zeolite in which the structure-directing agent (1-adamantanamine) is contained'" are preferably "DDR type zeolite crystals in which the structure-directing agent (1-adamantanamine) is contained". Though the "nuclei containing DDR type zeolite" may contain a structure-directing agent (1-adamantanamine) as described, it is not necessary that a structure-directing agent (1-adamantanamine) is contained. The "nuclei containing 'DDR type zeolite containing no structure-directing agent (1-adamantanamine)'" can be obtained by subjecting the "nuclei containing 'DDR type zeolite containing the structure-directing agent (1-adamantanamine)'" to a heating treatment to combust and remove 1-adamantanamine. The "nuclei containing 'DDR type zeolite containing no structure-directing agent (1-adamantanamine)'" are preferably DDR type zeolite crystals containing no structure-directing agent (1-adamantanamine).

The raw material solution (raw material sol) is a solution (sol) containing silica, and nuclei containing DDR type zeolite. It is preferable that the raw material solution contains 1-adamantanamine as a structure-directing agent. Further, water, ethylenediamine, and other additives may be mixed into the raw material solution.

The content of the "nuclei containing DDR type zeolite" in the raw material solution is preferably 0.0001 to 3% by mass, more preferably 0.001 to 2% by mass, and particularly preferably 0.01 to 1% by mass. When it is less than 0.0001% by mass, the production amount of the DDR type zeolite seed crystals may become small, or the particle size of the DDR type zeolite seed crystals may become too large. When it is more than 3% by mass, the particle size of the DDR type zeolite seed crystals may become too small, or amorphous substances remain to lower the crystallinity index of the resultant DDR type zeolite seed crystals.

When the raw material solution contains 1-adamantanamine as the structure-directing agent, the ratio of the "molar number of 1-adamantanamine" to the "molar number of silica" is preferably 0.1 or less. The ratio of the "molar number of 1-adamantanamine" to the "molar number of silica" (1-adamantanamine/silica) is preferably 0.01 to 0.05, more preferably 0.03 to 0.05. When the ratio of the "molar number of 1-adamantanamine" to the "molar number of silica" is higher than 0.05, the amount of surplus 1-adamantanamine which does not function as the structure-directing agent may increase to raise the production costs.

The ratio of the "molar number of water" to the "molar number of silica" (water/silica) is preferably 10 to 500, more preferably 10 to 200. When the ratio is lower than 10, the silica concentration is too high, which may make the formation of the DDR type zeolite difficult. When the ratio is higher than 500, the silica concentration is too low, which may make the formation of the DDR type zeolite difficult.

When ethylenediamine is contained in the raw material solution, 1-adamantanamine can easily be dissolved to be able to manufacture a DDR type zeolite powder having a uniform crystal size. The ratio of ethylenediamine to 1-adamantanamine (ethylenediamine/1-adamantanamine (molar ratio)) is preferably 4 to 35, more preferably 8 to 32. When the ratio is lower than 4, the amount is not sufficient for easy dissolution of 1-adamantanamine. When the ratio is higher than 35, the ethylenediamine uninvolved in the reaction becomes surplus, which may raise the production costs.

In the heating step, the raw material solution is heated at 130 to 180° C. for 4 hours or more (subjected to hydrothermal synthesis) to produce DDR type zeolite crystals. When the raw material solution contains 1-adamantanamine as a structure-directing agent, the resultant DDR type zeolite crystal is a DDR type zeolite crystal containing 1-adamantanamine. The heating temperature is 130 to 180° C. as described above, preferably 130 to 170° C., more preferably 140 to 170° C. When the temperature is lower than 130° C., formation of the DDR type zeolite crystal becomes difficult unfavorably. When it is higher than 180° C., another crystal phase is easily formed together with the DDR type zeolite crystal unfavorably. The heating period of time is 4 hours or more as described above, preferably 4 to 24 hours, more preferably 4 to 16 hours. When it is shorter than 4 hours, DDR type zeolite crystals are insufficiently formed unfavorably.

(2-2) Washing Step:

It is preferable that one embodiment of a method for manufacturing DDR type zeolite seed crystals of the present embodiment has a washing step for washing the formed DDR type zeolite crystals after the heating step. It is also preferable that, in the washing step, a DDR type zeolite crystal dispersion liquid is prepared by dispersing the washed DDR type zeolite crystals in a dispersion medium so that the dispersion liquid may have a pH of 7.5 or more. The hydrogen ion concentration of the dispersion liquid is more preferably pH 8.0 or more, particularly preferably pH 9.0 to pH 10.5. When the hydrogen ion concentration of the dispersion liquid has a pH of below 7.5, aggregation of particles of the DDR type zeolite seed crystals may become easy. As the dispersion medium in which the washed DDR type zeolite crystals are dispersed, water, alcohols, and the like can be mentioned. In addition, the aforementioned dispersion medium may be the liquid obtained after washing the DDR type zeolite crystals. If the dispersion medium is the liquid obtained after washing the DDR type zeolite crystals, it is preferable that the dispersion medium is the washing liquid (liquid after washing) with which the DDR type zeolite crystals are finally washed. This is because the liquid has the least pollution as a liquid after washing. As the washing liquid, water is preferably used. As the washing method, there may be mentioned a method using a shaker and a method using ultrasonic waves. In washing the DDR type zeolite crystals, it is preferable to use a washing liquid of 0.02 to 2 liter with respect to 1 g of the DDR type zeolite crystals.

When 1-adamantanamine is contained in the raw material solution, the washed DDR type zeolite crystal is to be a "DDR type zeolite seed crystal containing 1-adamantanamine". It is preferable that the specific surface area of the DDR type zeolite seed crystal containing 1-adamantanamine is smaller than the specific surface area obtained from a particle size distribution on the assumption that the "DDR type zeolite seed crystal is sphere". The specific surface area of the DDR type zeolite crystal containing 1-adamantanamine is a value measured by a $N_2$ adsorption method. The "specific surface area obtained from a particle size distribution on the assumption that 'the DDR type zeolite seed crystal is sphere'" is a value measured by the following method. That is, first, the particle size distribution of DDR type zeolite seed crystal precursors is measured by the use of a particle size distribution analyzer. Then, the specific surface area on the assumption that "the DDR type zeolite seed crystal is sphere" is calculated from the particle size distribution obtained above. As the particle size distribution analyzer, there is used an "apparatus for measuring the particle size distribution by a method using light scattering". For example, "Nanotrac (trade name) produced by Nikkiso Co., Ltd." is used for measuring the particle size distribution of the DDR type zeolite seed crystals.

In the case where the raw material solution contains no 1-adamantanamine, the washed DDR type zeolite crystal is to be "a DDR type zeolite seed crystal containing no 1-adamantanamine".

In the method for manufacturing DDR type zeolite seed crystals of the present embodiment, it is preferable to manufacture DDR type zeolite seed crystals without any mechanical treatment. Here, the mechanical treatment means a treatment such as pulverization or crushing and means to change the shape of the "DDR type zeolite crystals formed by hydrothermal synthesis" by adding a mechanical external force (to cause deformation by scraping or smashing).

(3) Method for Manufacturing a DDR Type Zeolite Membrane:

One embodiment of a method for manufacturing a DDR type zeolite membrane of the present invention has an application step where slurry containing DDR type zeolite seed crystals of the present invention is applied on the surface of the porous support to produce a seed crystal-provided porous support.

Thus, since the method for manufacturing a DDR type zeolite membrane of the present embodiment manufactures the DDR type zeolite membrane using a DDR type zeolite seed crystal of the present invention, the DDR type zeolite seed crystal hardly falls off the surface of the porous support. This enables to inhibit generation of surplus DDR type zeolite crystals.

The method for manufacturing a DDR type zeolite membrane of the present embodiment will be described for each step.

(3-1) Application Step:

The application step is a step where slurry containing DDR type zeolite seed crystals of the present invention (hereinbelow may be simply referred to as "DDR type zeolite seed crystals") is applied on the surface of the porous support to produce a seed crystal-adhered porous support. The slurry containing DDR type zeolite seed crystals is preferably slurry obtained by dispersing the DDR type zeolite seed crystals in alcohol. As the alcohol, ethanol is preferable. The content of the DDR type zeolite seed crystals in the slurry is preferably 0.001 to 0.5% by mass, more preferably 0.005 to 0.3% by mass, particularly preferably 0.01 to 0.2% by mass. When it is below 0.001% by mass, formation of the DDR type zeolite membrane may become difficult. When it is above 0.5% by mass, the thickness of the DDR type zeolite membrane may become non-uniform.

The porous support is preferably formed of ceramic. As the ceramic configuring the porous support, there may be mentioned alumina, mullite, cordierite, silicon carbide, titania, zirconia, glass, and a composite of these components. The shape of the porous support is not particularly limited, and an arbitrary shape may be employed according to the use. For example, a platy shape, a cylindrical shape, a honeycomb shape, and a monolith shape may be mentioned. Of these, a honeycomb shape or a monolith shape is preferable. These shapes enable to increase a membrane area per unit volume. The "monolith shape" means a columnar shape having a plurality of through-holes "which function as fluid passages, extend over the entire length between both the end faces, and are open at both the end faces". For example, there may be mentioned a shape where a cross section perpendicular to the through-hole extension direction has a shape of "a cross section perpendicular to the extension direction of voids" of a lotus root.

In the porous support, it is preferable that the average opening size of "pores opening at 'the portion (the surface) on which the seed crystals are applied' of the porous support" is not larger than the average particle size of the DDR type zeolite seed crystals. This enables to inhibit formation of a DDR type zeolite membrane inside the pores of the porous support. Here, the "opening size" is a diameter of an open end "formed at the surface of the porous support by pores formed in the porous support". In addition, the opening size is a value measured by the air flow method described in "ASTM F316" by cutting out a layer of the surface on which the DDR type zeolite seed crystals are applied, from the fired porous support.

The method for manufacturing the porous support is not particularly limited, and a known method can be employed. For example, the following method can be mentioned. First, a forming raw material containing a predetermined ceramic raw material is kneaded and then extruded using a die, with which a monolith-shaped formed body can be formed, to obtain a monolith-shaped formed body. Then, the monolith-shaped formed body is dried and fired to obtain a monolith-shaped porous support.

(3-2) DDR Type Zeolite Membrane Forming Step:

The method for manufacturing the DDR type zeolite membrane of the present embodiment preferably has a DDR type zeolite membrane forming step. The DDR type zeolite membrane forming step is a step of forming a DDR type zeolite membrane on the surface of the porous support by immersing a seed crystal-adhered porous support in a membrane-forming raw material solution containing 1-adamantanamine and silica and heating (subjecting it to hydrothermal synthesis). The DDR type zeolite membrane obtained in the DDR type zeolite membrane forming step is a DDR type zeolite membrane containing 1-adamantanamine. The DDR type zeolite membrane formed on the surface of the porous support is obtained by the growth of a plurality of DDR type zeolite seed crystals to a membrane by hydrothermal synthesis.

In the method for manufacturing the DDR type zeolite membrane of the present embodiment, the membrane-forming raw material solution contains 1-adamantanamine and silica, and preferably contains water in addition. The membrane-forming raw material solution may further contain ethylenediamine and other additives.

Upon preparing the membrane-forming raw material solution, the ratio of the molar number of the 1-adamantanamine to the molar number of the silica (1-adamantanamine/silica (molar ratio)) is preferably 0.02 to 0.5, more preferably 0.002 to 0.2. When it is lower than 0.002, formation of DDR type zeolite may become difficult because 1-adamantanamine as the structure-directing agent is insufficient. When it is higher than 0.5, surplus 1-adamantanamine, which is not taken into the DDR type zeolite membrane, may increase. The ratio of water to silica (water/silica (molar ratio)) is preferably 10 to 500, more preferably 10 to 200.

When it is lower than 10, formation of the DDR type zeolite membrane may be difficult because the silica concentration is too high. When the ratio is higher than 500, formation of the DDR type zeolite membrane may be difficult because the silica concentration is too low.

When ethylenediamine is contained in the membrane-forming raw material solution, 1-adamantanamine can easily be dissolved therein, and a DDR type zeolite membrane having a uniform thickness can be manufactured. The ratio of the molar number of ethylenediamine to the molar number of 1-adamantanamine (ethylenediamine/1-adamantanamine (molar ratio)) is preferably 4 to 35, more preferably 8 to 32. When it is lower than 4, the amount is insufficient for easy dissolution of 1-adamantanamine. When it is higher than 35, ethylenediamine which does not contribute to the reaction may become excessive.

In addition, it is preferable to prepare 1-adamantanamine solution by dissolving 1-adamantanamine in ethylenediamine in advance. It is preferable to prepare the membrane-forming raw material solution by mixing the 1-adamantanamine solution prepared in such a manner as described above and a silica sol solution containing silica together. This enables to dissolve 1-adamantanamine in the membrane-forming raw material solution more easily and completely. Further, this enables to manufacture a DDR type zeolite membrane having a uniform thickness. In addition, the silica sol solution can be prepared by dissolving a fine powdered silica in water or by subjecting alkoxide to hydrolysis. However, it can be prepared also by adjusting the silica concentration of a commercially available silica sol.

As a method for forming a DDR type zeolite membrane precursor on the surface of the porous support by immersing the seed crystal-adhered porous support in the membrane-forming raw material solution and then heating, the following method can be mentioned. That is, it is a method for forming a DDR type zeolite membrane containing a structure-directing agent on the surface of a porous support by putting a porous support in a pressure-resistant container or the like containing a membrane-forming raw material solution, and subjecting the porous support to hydrothermal synthesis by maintaining the porous support at the following predetermined temperature for a predetermined period of time.

In the DDR type zeolite membrane forming step, the temperature condition upon hydrothermal synthesis is preferably 100 to 200° C., more preferably 120 to 180° C., particularly preferably 130 to 160° C. When the hydrothermal synthesis is performed at a temperature of below 100° C., formation of the DDR type zeolite membrane may be difficult. When the hydrothermal synthesis is performed at a temperature of above 200° C., a crystal phase different from that of DDR type zeolite may be formed.

The thickness of the DDR type zeolite membrane precursor formed on the surface of the porous support is preferably 0.5 to 6 μm. When it is larger than 6 μm, the permeation rate at which fluid to be treated passes through the resultant DDR type zeolite membrane may become low. When the thickness is smaller than 0.5 μm, the separation performance of the resultant DDR type zeolite membrane may deteriorate. The thickness of the DDR type zeolite membrane is an average value of the thicknesses at five points in a cross section, measured by an electron micrograph of a cross section taken along the thickness direction.

In the DDR type zeolite membrane forming step, it is preferable that the ratio of "precipitates other than the DDR type zeolite membrane" to the membrane-forming raw material solution is 0.2% or less by mass. The "precipitates other than the DDR type zeolite membrane" mean masses or the like of the "DDR type zeolite crystals containing 1-adamantanamine", which do not configure a DDR type zeolite membrane, and, for example, formed on the "portion having no DDR type zeolite membrane therein" of the porous support. The ratio of "precipitates other than the DDR type zeolite membrane" to the membrane-forming raw material solution is preferably 0.2% or less by mass, more preferably 0 to 0.15% by mass, particularly preferably 0 to 0.1% by mass. When it is higher than 0.2% by mass, through-holes may be clogged with the precipitates when, for example, a monolith-shaped porous support is used.

(3-3) DDR Type Zeolite Membrane Pore Forming Step:

The method for manufacturing the DDR type zeolite membrane of the present embodiment preferably has a pore forming step for the DDR type zeolite membrane after the DDR type zeolite membrane forming step. The pore forming step for the DDR type zeolite membrane is a step of removing 1-adamantanamine by heating the DDR type zeolite membrane containing the structure-directing agent to form a DDR type zeolite membrane containing no structure-directing agent (DDR type zeolite membrane disposed on the surface of the porous support). Then, the resultant DDR type zeolite membrane has pores. The "pores of the DDR type zeolite membrane" mean the spaces formed in "portions, where 1-adamantanamine had been present, of the DDR type zeolite crystal" by removing 1-adamantanamine in the DDR type zeolite crystal, and open pores communicating with the outside. The pore forming step for the DDR type zeolite membrane is preferably the following step for example. That is, it is preferable that a porous support having a DDR type zeolite membrane containing a structure-directing agent is put in a heating device, and heated at 400 to 800° C. for 4 to 100 hours to combust and remove 1-adamantanamine contained in the DDR type zeolite membrane. This enables to obtain a DDR type zeolite membrane formed on the surface of the porous support (DDR type zeolite membrane containing no 1-adamantanamine). As the heating device, an electric furnace or the like may be employed. A DDR type zeolite membrane of the present invention is preferably a "DDR type zeolite membrane containing no 1-adamantanamine". Though a DDR type zeolite membrane containing 1-adamantanamine is included in DDR type zeolite membranes of the present invention, a "DDR type zeolite membrane containing no 1-adamantanamine" is preferable in the case of using the membrane as a gas separation membrane or a pervaporation membrane.

EXAMPLES

The present invention will hereinbelow be described more specifically by Examples. However, the present invention is not limited to these Examples.

Example 1

After 12.63 g of ethylenediamine (produced by Wako Pure Chemical Industries, Ltd.) was put in a 250 ml fluorine resin airtight container, 1.98 g of 1-adamantanamine (produced by Sigma-Aldrich Co. LLC) was added thereto to completely dissolve the 1-adamantanamine by ultrasonic waves. In another container was put 149.45 g of an aqueous solution (nuclei-containing solution) containing 0.5% by mass of DDR type zeolite crystals as nuclei, and 97.90 g of silica sol (SNOWTEX S, produced by Nissan Chemical Industries, Ltd.) containing 30% by mass of silica was added thereto and stirred to obtain "silica sol containing nuclei".

Subsequently, the resultant "silica sol containing nuclei" was quickly put in the previously prepared airtight container containing "ethylenediamine in which 1-adamantanamine was dissolved", and they were shaken by a shaker until the mixed liquid in the airtight container became clear to obtain a raw material solution (raw material sol). The period of shaking time was one hour.

The DDR type zeolite crystals used as the nuclei were obtained by preparing a DDR type zeolite powder on the basis of the method described in WO 2010/09049A1 and pulverizing the powder. The method of producing nuclei from the DDR type zeolite powder was specifically as follows. The DDR type zeolite crystals having an average particle size of 2.9 μm were subjected to a pulverization treatment for 90 minutes by a bead mill having a trade name of Star Mill produced by Ashizawa Finetech, Ltd. After the pulverization treatment, centrifugation was performed at 3000 rpm for 15 minutes to remove coarse particles. Thus, nuclei having an average particle size of 168 nm were obtained.

The resultant nuclei had an average particle size of 168 nm. The concentration of nuclei in the raw material solution was 0.29% by mass.

Next, DDR type zeolite seed crystals were prepared by the use of three containers. The DDR type zeolite seed crystals (dispersion liquid) prepared in the three containers were mixed together to obtain seed crystals for producing the DDR type zeolite membrane. Specifically, first, a raw material solution was put in the three containers. As the containers, there were used stainless steel pressure resistant containers each having a fluorine resin inner cylinder having a capacity of 100 ml. Then, the raw material solution in the containers was heated at 160° C. for 16 hours (subjected to hydrothermal synthesis). After the hydrothermal synthesis, washing was performed until the pH becomes about 10 to obtain a "dispersion liquid" in which the DDR type zeolite seed crystals were dispersed in water. Then, the dispersion liquids prepared in the three containers was mixed together to obtain one "DDR type zeolite seed crystal dispersion liquid". If a "DDR type zeolite seed crystal" is referred to in the following descriptions, it means a DDR type zeolite seed crystal taken out of the aforementioned "DDR type zeolite seed crystal dispersion liquid".

The resultant DDR type zeolite seed crystals had an average particle size of 241 nm. In addition, the DDR type zeolite seed crystals had a crystallinity index of 88. In addition, the DDR type zeolite seed crystals had an aspect ratio (AR) of 1.48. In addition, the coefficient of variation (C. V.) of the "square of the aspect ratio ($AR^2$)" of the DDR type zeolite seed crystals was 0.25. In addition, the content of "particles having an aspect ratio of 1 to 3" was 100%. Further, the final "DDR type zeolite seed crystal dispersion liquid" had a pH of 10.2. The measurement method for each measurement value is shown below. FIG. 1 shows a micrograph (SEM image) of the resultant DDR type zeolite seed crystal.

(Average Particle Size)

Drops of the aforementioned "DDR type zeolite seed crystal dispersion liquid" are put into water of about 20 ml to obtain a measurable concentration. Then, dispersion for not less than 5 minutes is performed by ultrasonic waves to prepare a DDR type zeolite seed crystal suspension. The prepared suspension is measured for a particle size distribution by "Nanotrac (trade name) produced by Nikkiso Co., Ltd.".

(Crystallinity Index)

The crystallinity index of the DDR type zeolite seed crystal is obtained by the XRD measurement (powder X-ray diffraction measurement). Specifically, first, for the crystallinity index, the diffraction intensity of the diffraction peak due to the (024) plane of the resultant DDR type zeolite crystals is defined as A. The minimum value of a diffraction intensity between the peaks of the (024) plane and the (116) plane, which is influenced by an amorphous substance, is defined as B, and the minimum value of a diffraction intensity between the peaks of the (024) plane and the (202) plane is defined as C. In that case, the crystallinity index is a value Y ((A−C)/(B−C)) obtained by dividing the remainder of subtraction of C from A by the remainder of subtraction of C from B. The device used for the X-ray diffraction measurement is "trade name (model number): RINT-2500, produced by Rigaku Corporation". The tube voltage and tube current upon the measurement are 50 kV and 300 mA, respectively.

(Aspect Ratio)

The aspect ratio is obtained by "FE-SEM (field emission scanning electron microscopy (in-lens))" observation. The device used for the FE-SEM observation is ULTRA55 in the trade name (model number), produced by ZEISS AG. As the "FE-SEM" used below, the aforementioned device is used in all the cases. The aspect ratio is a "value obtained by dividing the maximum Feret's diameter by the minimum Feret's diameter". The maximum Feret's diameter is a distance between two parallel straight lines which sandwich a DDR type zeolite seed crystal so that the "distance between the two parallel straight lines becomes largest" on a FE-SEM image of a DDR type zeolite seed crystal. In addition, the minimum Feret's diameter is a distance between two parallel straight lines which sandwich a DDR type zeolite seed crystal so that the "distance between the two parallel straight lines becomes smallest" on a FE-SEM image of a DDR type zeolite seed crystal. The maximum Feret's diameter and the minimum Feret's diameter are obtained by observing a DDR type zeolite seed crystal by the use of a FE-SEM (field emission scanning electron microscopy (in-lens)) as described above. When a DDR type zeolite seed crystal is observed by the use of a FE-SEM, the DDR type zeolite seed crystals are observed within an area including at least 20 DDR type zeolite seed crystals and ranging "from (average particle size)$^2$×50 to (average particle size)$^2$×200". Then, regarding 20 DDR type zeolite seed crystals, the maximum Feret's diameter and the minimum Feret's diameter are measured, and each aspect ratio is calculated. Then, the aspect ratios of the 20 DDR type zeolite seed crystals obtained as above are averaged to determine the aspect ratio of the target DDR type zeolite seed crystals to be measured. The "average particle size" means a median value (D50) of particle sizes based on volume of the DDR type zeolite seed crystals. The "average particle size" is a value measured by a dynamic light-scattering method.

(Content of "Particles Having an Aspect Ratio of 1 to 3")

The DDR type zeolite seed crystals are observed by the use of a FE-SEM (field emission scanning electron microscopy (in-lens)). The DDR type zeolite seed crystals are observed within an area including at least 20 DDR type zeolite seed crystals and ranging "from (average particle size)$^2$×50 to (average particle size)$^2$×200". Then, regarding 20 DDR type zeolite seed crystals, the maximum Feret's diameter and the minimum Feret's diameter are measured, and each aspect ratio is calculated. Then, the content of the "particles having an aspect ratio of 1 to 3" is calculated.

(Coefficient of Variation of the Square of the Aspect Ratio)

The "coefficient of variation of the square of the aspect ratio" is a value obtained by dividing the standard deviation of the "square of the aspect ratio" by the average value of the "square of the aspect ratio". The "coefficient of variation of the square of the aspect ratio" is measured as follows. DDR type zeolite seed crystals are observed by the use of a FE-SEM (field emission scanning electron microscopy (in-lens)). The DDR type zeolite seed crystals are observed within an area including at least 20 DDR type zeolite seed crystals and ranging "from (average particle size)$^2$×50 to (average particle size)$^2$×200". Then, regarding 20 DDR type zeolite seed crystals, the maximum Feret's diameter and the minimum Feret's diameter are measured, and each aspect ratio is calculated. Then, using the obtained aspect ratio regarding the 20 DDR type zeolite seed crystal, the "coefficient of variation of the square of the aspect ratio" is obtained.

funnel was poured into cells of the monolith-shaped porous support. Then, the seeding slurry was passed through the cells of the porous support (seeding slurry falling operation). The seeding slurry poured into the cells of the porous support had a volume of 160 cm$^3$. The porous support was in a columnar shape having a bottom face diameter of 30 mm and a length in the central axial direction of 160 mm. In addition, 55 cells "extending from one end face to the other end face and being open in both the end faces" were formed in the porous support. Then, the diameter of a cross section perpendicular to the central axial direction of the cell (diameter of the cell) was 2.34 mm. In addition, the average particle size of the porous support was 0.12 μm. In addition, in the porous support, a titania layer was formed on a surface of the alumina substrate.

After pouring the seeding slurry into the cells of the porous support to apply the seeding slurry (DDR type zeolite seed crystals) on the wall faces in the cells, air was sent in the cells at a wind velocity of 2 to 7 m/sec. The operation of

TABLE 1

| | Nuclei | | | | Seed Crystal | | | | | | |
|---|---|---|---|---|---|---|---|---|---|---|---|
| | Nuclei concentration in raw material solution (mass %) | Average particle size (nm) | Heating temperature (° C.) | Heating Time (hour) | Average particle size (nm) | Crystallinity index | Aspect ratio | Coefficient of variation of square of aspect ratio | Content of particles having an aspect ratio of 1 to 3 (%) | pH of dispersion liquid | Pulverization treatment |
| Example 1 | 0.29 | 168 | 160 | 16 | 241 | 88 | 1.48 | 0.25 | 100 | 10.2 | None |
| Example 2 | 0.036 | 168 | 160 | 16 | 443 | 163 | 1.54 | 0.26 | 100 | 8.6 | None |
| Example 3 | 0.29 | 248 | 160 | 16 | 318 | 138 | 1.54 | 0.22 | 100 | 9.5 | None |
| Example 4 | 0.29 | 150 | 140 | 16 | 215 | 76 | 1.2 | 0.18 | 100 | 9.8 | None |
| Example 5 | 0.23 | 155 | 160 | 4 | 234 | 84 | 1.4 | 0.19 | 100 | 9.9 | None |
| Example 6 | 1.1 | 168 | 160 | 16 | 186 | 75 | 1.58 | 0.29 | 100 | 8 | None |
| Example 7 | 3 | 124 | 140 | 12 | 152 | 65 | 1.38 | 0.26 | 100 | 10.5 | None |
| Comp. Ex. 1 | 0.29 | 172 | 160 | 16 | 254 | 50 | 1.68 | 0.42 | 100 | 7.6 | Done |
| Comp. Ex. 2 | 0.29 | 168 | 160 | 16 | 248 | 54 | 1.57 | 0.35 | 100 | 8.4 | Done |

Example 2 to 7, Comp. Ex. 1 and 2

Figure 2:
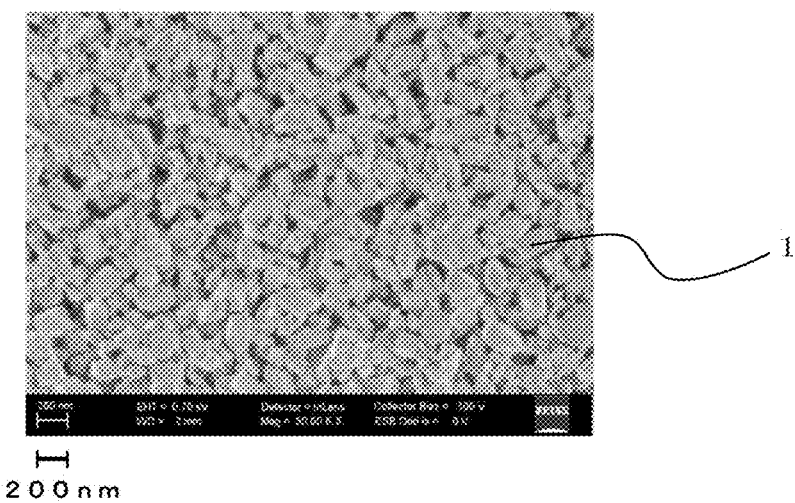
FIG. 2 is a micrograph of DDR type zeolite seed crystals of Comparative Example 1.

DDR type zeolite seed crystals were produced in the same manner as in Example 1 except that the production conditions were changed as shown in Table 1. The aforementioned evaluation was made in the same manner as in Example 1. The results are shown in Table 1. In addition, FIG. 2 shows a micrograph (SEM image) of a DDR type zeolite seed crystal of Comparative Example 1.

Example 8

The "DDR type zeolite seed crystal dispersion liquid" obtained in Example 1, in which the DDR type zeolite seed crystals were dispersed in water, was exposed to ultrasonic waves for five minutes. Then, the dispersion liquid was dropped in ethanol, which was stirred by a stirrer to prepare "seeding slurry (slurry containing DDR type zeolite seed crystals)" having a DDR seed crystal concentration of 0.018% by mass.

The porous support was placed so that one end face is oriented to the upper side of the vertical direction. Then, on the upper side of the aforementioned one end face of the porous support, a "wide-mouth funnel" having a wide outlet was disposed. The diameter of the outlet of the wide-mouth funnel was about the same as that of the aforementioned one end face of the porous support. Then, the seeding slurry obtained above was poured into the wide-mouth funnel, and the seeding slurry flowed out of the outlet of the wide-mouth sending air in the cells was performed in room temperature. In addition, the time for sending the air in the cells was 10 minutes. This operation dried the seeding slurry applied on the wall faces in the cells (drying operation).

A series of the aforementioned "seeding slurry falling operation" and "drying operation" each being performed once was defined as "one cycle operation", and such "one cycle operation" was performed twice in total to obtain a seed crystal-adhered porous support.

After 6.821 g of ethylenediamine (produced by Wako Pure Chemical Industries, Ltd.) was put in a fluorine resin container, 1.073 g of 1-adamantanamine (Sigma-Aldrich Co. LLC) to dissolve 1-adamantanamine completely. In another container were put 90.95 g of silica sol (SNOWTEX S, produced by Nissan Chemical Industries, Ltd.) containing 30% by mass of silica and 108.2 g of ion-exchange water, and they were lightly stirred to prepare a silica dispersion liquid. Then, to the silica dispersion liquid was added the previously prepared ethylenediamine solution containing 1-adamantanamine dissolved therein, and they were stirred with a homogenizer for 90 minutes to prepare a membrane-forming raw material solution.

The seed crystal-adhered porous support was disposed in a stainless steel pressure resistant container provided with a fluorine resin inner cylinder having a capacity of 300 cm$^3$, and the membrane-forming raw material solution prepared above was put in the container to perform a heating treatment (hydrothermal synthesis) at 135° C. (synthesis temperature) for 20 hours (synthesis time). Thereby, a DDR type zeolite membrane (DDR type zeolite membrane containing 1-adamantanamine) was formed on the wall faces in the cells of the porous support. Then, the porous support having a DDR type zeolite membrane (DDR type zeolite membrane containing 1-adamantanamine) formed thereon was taken out and washed with water for three hours.

Then, the resultant "porous support having a DDR type zeolite membrane (DDR type zeolite membrane containing 1-adamantanamine) formed thereon" was heated at 460° C. for 50 hours for combusting and removing 1-adamantanamine to obtain a DDR type zeolite membrane (DDR type zeolite membrane containing no 1-adamantanamine) disposed on the wall faces of the cells of the porous support.

The resultant porous support on which the DDR type zeolite membrane (DDR type zeolite membrane containing no 1-adamantanamine) was disposed had no "clogged cell" due to DDR type zeolite crystals at all. In addition, there were few DDR type zeolite crystals precipitated on the end faces of the porous support (end face precipitation). Further, there were almost no DDR type zeolite crystals precipitated at the bottom of the "stainless steel pressure resistant container with a fluorine resin inner cylinder" used for forming (hydrothermal synthesis) of the DDR type zeolite membrane (container precipitation). In addition, DDR type zeolite crystals precipitated on the end faces and in the container had an amount of 0.02% by mass of the membrane-forming raw material solution. From this, it can be understood that the DDR type zeolite seed crystals were not detached in the membrane-forming raw material solution. It is preferable that the DDR type zeolite crystals precipitated on the end faces and in the container have an amount of 0.2% by mass with respect to the membrane-forming raw material solution. The mass ratio of the precipitated crystals to the membrane-forming raw material solution is called as "precipitated crystal ratio". The production conditions and evaluation results of the DDR type zeolite membranes are shown in Table 2.

In Table 2, the column of the "seed crystal" shows origins (numbers of Examples and Comparative Examples) of the DDR type zeolite seed crystals used for the production of DDR type zeolite membranes. In addition, the column of the "porous support" shows shapes of the porous supports used for the production of the DDR type zeolite membranes. Specifically, "30" means a monolith shape having a bottom face diameter of 30 mm and a length in the central axial direction (the direction in which the cells are extended) of 160 mm. "180" means a monolith shape (circular columnar shape in the external shape) having a bottom face diameter of 180 mm and a length in the central axial direction (the direction in which the cells are extended) of 1000 mm. The column of the "clogged cells" shows whether any cell was clogged or not after the DDR type zeolite membranes were formed. "Present" was given when there was a clogged cell, and "none" was given when there was no clogged cell. The column of "end face precipitation" shows results of observation of the DDR type zeolite crystals precipitated on the end faces of the porous support (end face precipitation). "Few" means that there were few DDR type zeolite crystals precipitated on the end faces of the porous support. "Many" means that there were many DDR type zeolite crystals precipitated on the end faces of the porous support. The column of the "container precipitation" shows results of observation of the DDR type zeolite crystals precipitated at the bottom of the "stainless steel pressure resistant container with a fluorine resin inner cylinder". "None" means that there was almost no precipitation of DDR type zeolite crystals at the bottom of the "stainless steel pressure resistant container with a fluorine resin inner cylinder". "Present" means that DDR type zeolite crystals were precipitated so as to cover the entire bottom of the "stainless steel pressure resistant container with a fluorine resin inner cylinder".

TABLE 2

| | Seed Crystal | Porous support (mm) | Seeding slurry concentration (mass %) | Synthesis temperature (° C.) | Synthesis time (h) | Washing time (h) | Cell diameter (mm) | Clogged cells | End face precipitation | Container precipitation | Precipitated crystal ratio (mass %) |
|---|---|---|---|---|---|---|---|---|---|---|---|
| Example 8 | Example 1 | 30 | 0.018 | 135 | 20 | 3 | 2.34 | None | Few | None | 0.02 |
| Example 9 | Example 1 | 30 | 0.1 | 160 | 12 | 3 | 2.34 | None | Few | None | 0.01 |
| Example 10 | Example 3 | 30 | 0.018 | 138 | 42 | 3 | 2.34 | None | Few | None | 0.02 |
| Example 11 | Example 4 | 30 | 0.053 | 138 | 25 | 168 | 2.14 | None | Few | None | 0.01 |
| Example 12 | Example 6 | 30 | 0.053 | 138 | 25 | 168 | 2.14 | None | Few | None | 0.04 |
| Example 13 | Example 1 | 180 | 0.018 | 138 | 42 | 72 | 2.34 | None | Few | None | 0.00 |
| Comp. Ex. 3 | Comp. Ex. 1 | 30 | 0.006 | 135 | 50 | 168 | 2.34 | Present | Many | Present | 0.66 |
| Comp. Ex. 4 | Comp. Ex. 1 | 30 | 0.006 | 150 | 16 | 3 | 2.34 | Present | Many | Present | 0.40 |
| Comp. Ex. 5 | Comp. Ex. 2 | 30 | 0.008 | 138 | 46 | 168 | 2.34 | Present | Many | Present | 0.72 |
| Comp. Ex. 6 | Comp. Ex. 2 | 30 | 0.04 | 138 | 25 | 3 | 2.14 | Present | Many | Present | 1.20 |
| Comp. Ex. 7 | Comp. Ex. 2 | 180 | 0.006 | 138 | 42 | 72 | 2.34 | Present | Many | Present | 2.02 |

Examples 9 to 13, Comparative Examples 3 to 7

As shown in Table 2, DDR type zeolite membranes were produced in the same manner as in Example 8 except that some of the production conditions were changed. The aforementioned evaluations were made in the same manner as in Example 8. The results are shown In Table 2. In Table 2, each of the porous supports having a "cell diameter" of 2.34 mm had a titania layer formed on the surface of the alumina substrate. In addition, each of the porous supports having a "cell diameter" of 2.14 mm had an alumina layer formed on the surface of the alumina substrate.

From Examples 8 to 13, it can be understood that production of a DDR type zeolite membrane using DDR type zeolite seed crystals of Examples 1 to 7 can inhibit precipitation of surplus DDR type zeolite crystals.

INDUSTRIAL APPLICABILITY

The DDR type zeolite seed crystals of the present invention can preferably be used for producing a DDR type zeolite membrane.

DESCRIPTION OF REFERENCE NUMERALS

1: DDR type zeolite seed crystal

The invention claimed is:

1. A method for manufacturing a DDR type zeolite seed crystal, comprising:
   a heating step of heating a raw material solution containing silica, and a nucleus containing a DDR type zeolite, at 130 to 180° C. for four hours or more to form a DDR type zeolite seed crystal; and
   a washing step of washing the formed DDR type zeolite seed crystal, by preparing a DDR type zeolite seed crystal dispersion liquid by dispersing the DDR type zeolite seed crystal in a dispersion medium to obtain a DDR type zeolite seed crystal-dispersed liquid having a pH of 7.5 or more,
   wherein the resulting DDR type zeolite seed crystal has an average particle size of 0.05 to 1.5 μm, contains 90% or more of particles having an aspect ratio, which is a value obtained by dividing the maximum Feret's diameter by the minimum Feret's diameter, of 1 to 3, and has not more than 0.3 of a coefficient of variation of the square of the aspect ratio.

2. The method according to claim 1, wherein a Y value calculated from the following formula (1) is not less than 60, while defining a diffraction intensity of a diffraction peak caused by (024) plane of the DDR type zeolite seed crystal as A, a minimum value of a diffraction intensity between the peaks of the (024) plane and (116) plane, which is influenced by an amorphous substance content, as B, and a minimum value of a diffraction intensity between the peaks of the (024) plane and (202) plane as C on the basis of the diffraction intensity obtained by X-ray diffraction analysis.

$$Y=(A-C)/(B-C) \qquad (1)$$

3. The method according to claim 1, wherein the nucleus is a DDR type zeolite crystal or a mixture of a DDR type zeolite crystal and amorphous silica.

4. The method according to claim 1, wherein the raw material solution further contains 1-adamantanamine as a structure-directing agent of DDR type zeolite, and the ratio of the molar number of the 1-adamantanamine to the molar number of the silica is 0.1 or less.

5. The method according to claim 4, wherein the DDR type zeolite seed crystal contains the 1-adamantanamine, and the specific surface area of the DDR type zeolite seed crystal containing the 1-adamantanamine is smaller than the specific surface area obtained from a particle size distribution on the assumption that the DDR type zeolite seed crystal is sphere.

6. The method according to claim 1, wherein the DDR type zeolite seed crystal is manufactured without adding a mechanical external force to cause deformation of a shape of the DDR type zeolite seed crystal formed by the heating step.

7. A method for manufacturing a DDR type zeolite membrane, the method having an application step of applying slurry containing the DDR type zeolite seed crystal manufactured by the method for manufacturing a DDR type zeolite seed crystal according to claim 1 on a surface of a porous support to manufacture a seed crystal-adhered porous support.

8. The method according to claim 7, wherein the average value of the opening size of pores opening on the surface of the portion of the porous support on which the seed crystal is to be applied, is not larger than the average particle size of the DDR type zeolite seed crystal.

9. The method according to claim 7, comprising a DDR type zeolite membrane forming step of immersing the seed crystal-adhered porous support in a membrane-forming raw material solution containing 1-adamantanamine and silica, and heating to form a DDR type zeolite membrane, which is a DDR type zeolite membrane containing 1-adamantanamine, on the surface of the porous support.

10. The method according to claim 9, wherein, in the DDR type zeolite membrane forming step, the ratio of precipitates other than the DDR type zeolite membrane to the membrane-forming raw material solution is 0.2% or less by mass.

* * * * *